United States Patent
Jaworowicz et al.

(10) Patent No.: US 8,187,105 B2
(45) Date of Patent: May 29, 2012

(54) FLANGE JOINT

(75) Inventors: Casimir S. Jaworowicz, China, MI (US); Donald Sacharski, Eastpointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 12/361,671

(22) Filed: Jan. 29, 2009

(65) Prior Publication Data
US 2010/0190560 A1   Jul. 29, 2010

(51) Int. Cl.
F16D 9/06 (2006.01)
B23P 11/00 (2006.01)

(52) U.S. Cl. .................. 464/33; 29/525.01; 464/182

(58) Field of Classification Search .............. 464/33, 464/182, 32; 403/335–338, 2; 29/525.01
See application file for complete search history.

(56) References Cited

U.S. PATENT DOCUMENTS

| | | | | |
|---|---|---|---|---|
| 1,637,944 | A * | 8/1927 | Keller | 464/33 |
| 1,870,153 | A * | 8/1932 | Thoman | 464/33 |
| 1,946,661 | A * | 2/1934 | Baker | 464/182 |
| 2,803,474 | A * | 8/1957 | Wilson | 403/336 |
| 2,876,635 | A * | 3/1959 | Saurer | 464/182 |
| 3,157,054 | A * | 11/1964 | Dean | 464/182 |
| 3,927,537 | A * | 12/1975 | Anderson et al. | 403/335 |
| 5,472,073 | A * | 12/1995 | Hay | 464/182 |
| 7,232,372 | B2 * | 6/2007 | Nagatani et al. | |

FOREIGN PATENT DOCUMENTS

WO   WO 2006046890 A1 *  5/2006

OTHER PUBLICATIONS

"Basic Requirements for Constant Velocity (CV) Universal Joints." Universal Joint and Driveshaft Design Manual. Warrendale, PA: Society of Automotive Engineers, 1979. 99-101. Print.*
"Dowel." Answers.com. Jul. 31, 2005. Web. Feb. 15, 2011. <http://replay.waybackmachine.org/20050731083759/http://www.answers.com/topic/dowel>.*
"Slip Fit." Virtual Machine Shop. Jan. 6, 2009. Web. Feb. 15, 2011. <http://replay.waybackmachine.org/20090106175630/http://www.jjjtrain.com/vms/glossary/s/slip_fit.html>.*
"Spring Dowel Pins." RK Engineering. May. 6, 2006. Web. Feb. 15, 2011. <http://replay.waybackmachine.org/20060506115420/http://www.rkengineeringco.com/Spring Dowel Pin.htm>.*

(Continued)

Primary Examiner — Gregory Binda
Assistant Examiner — Josh Skroupa
(74) Attorney, Agent, or Firm — Ingrassia, Fisher & Lorenz, P.C.

(57) ABSTRACT

Methods and apparatus are provided for assembling a flange joint for use in a driveline. In an exemplary embodiment the apparatus includes a first flange with a first recess. A second flange may be configured to join with the first flange for translating rotational motion between the first flange and the second flange, the second flange having a second recess corresponding in position to the first recess in the first flange. A shear force member may have a first part configured to contact the first recess and a second part opposite the first part configured to contact the second recess, the second part may have an inclined surface. Multiple fasteners may connect the first flange to the second flange such that the inclined surface of the shear force member is held in contact with the second recess.

18 Claims, 3 Drawing Sheets

OTHER PUBLICATIONS

"What is the Defintion of Press Fit?" Tooling U. May 11, 2008. Web. Feb. 15, 2011. <http://replay.waybackmachine.org/20080511011612/http://www.toolingu.com/definition-700125-20082-pr.*

NORD-Lock Bolt securing system. NORD-Lock brochures. English—Intro [online]. NORD-Lock AB, 2008 [Retrieved on Jan. 28, 2009]. Retrieved from Internet: <URL: http://www.nord-lock.com/default.asp? url=320.16.37>.

* cited by examiner

FLANGE JOINT

TECHNICAL FIELD

The following disclosure generally relates to drive shafts, and more particularly relates to flange joints used with drive shafts.

BACKGROUND

Drive shafts, such as prop shafts and half shafts are used in automobiles and other applications to transfer rotational motion in a driveline from one component to another, such as from a transmission to a wheel. Flange joints are used to join the drive shaft to a part of the driveline such as a CV joint. In conventional flange joints the torque that can be delivered through the joint is dependent on the strength of fasteners that hold the flange joint together. If too much torque is applied to the flange joint, the joint may slip and the fasteners may break or deform. In conventional flange joints the strength of the flange joint may be increased by increasing bolt size and/or increasing the number of fasteners in the flange joint. Increasing the bolt size and/or the number of fasteners typically requires an increase in the size of the flange joint which is not practical in many applications.

Accordingly, it is desirable to increase the strength of a flange joint in a driveline. In addition, it is desirable to reduce the slippage in a flange joint. Furthermore, other desirable features and characteristics will become apparent from the subsequent detailed description and the appended claims, taken in conjunction with the accompanying drawings and the foregoing technical field and background.

SUMMARY

An apparatus is provided for transferring torque in a drive line. In an exemplary embodiment the apparatus comprises a first flange with a first recess. A second flange may be configured to join with the first flange for translating rotational motion between the first flange and the second flange, the second flange having a second recess corresponding in position to the first recess in the first flange. A shear force member may have a first part configured to contact the first recess and a second part opposite the first part configured to contact the second recess, the second part may have an inclined surface. Multiple fasteners may connect the first flange to the second flange such that the inclined surface of the shear force member is held in contact with the second recess.

A method is provided for assembling a flange joint configured to transmit torque. In an exemplary embodiment the flange joint comprises a first flange and a second flange, and shear force members configured to transfer a difference in relative rotational position to increased normal force. The method comprises: forming two openings in the first flange; forming two openings in the second flange corresponding to the two openings in the first flange; and joining the first flange to the second flange using fasteners. The shear force members may contact the openings in the first flange and the openings in the second flange. The shear force members may create a slip fit such that movement of the first flange relative to the second flange increases a normal force on the fasteners.

DESCRIPTION OF THE DRAWINGS

A more complete understanding of the subject matter may be derived by referring to the detailed description and claims when considered in conjunction with the following figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

A flange joint in an exemplary embodiment includes shear force members such as pins and/or balls to carry the shear force between a first flange and a second flange. The shear force member may be coupled between the first flange and the second flange and configured to carry the shear force caused by the translation of torque between the flanges. In one embodiment the shear force member translates the shear force into a normal force that is carried by fasteners that hold the first flange to the second flange. The shear force member may have an inclined surface, and may contact an inclined surface on one or both of the flanges so that when a shear force is applied between the inclined surface of the shear force member and the inclined surface of the flange, the inclined planes interact to increase a normal force on the fasteners. In the exemplary embodiment, with the shear force member carrying the shear force and/or translating the shear force into normal force on the fasteners, a flange joint may be made that carries higher torque loads without failure, and without increasing the size of the flange joint. In addition, the number of fasteners may be reduced thereby reducing the labor costs and/or time for assembly of the flange joint.

Figure 1:
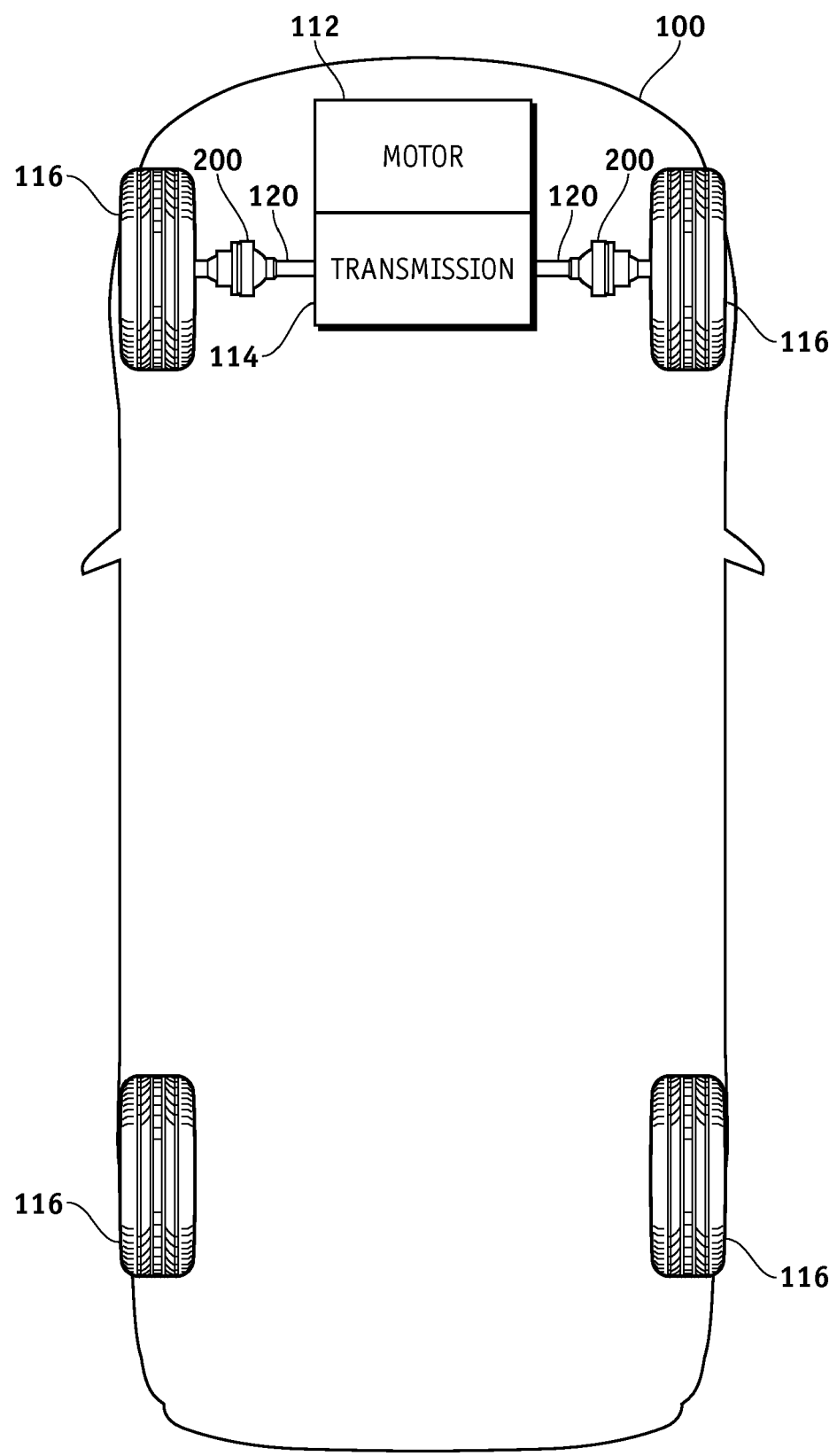
FIG. 1 is a bottom view of a vehicle according to an exemplary embodiment.

FIG. 1 shows an exemplary vehicle 100 including a motor 112, a transmission 114 and wheels 116. In the exemplary embodiment transmission 114 drives wheels 116 using a drive shaft 120 and a flange joint 200. Vehicle 100 is shown in the exemplary embodiment as a passenger automobile. In other embodiments vehicle 100 may be other types of vehicles such as motorcycles, airplanes, boats, and other vehicles that use or can be made to use a flange joint for translating torque. Motor 112 may be any type of motor or engine such as an internal combustion engine, or an electric motor. Transmission 114 may be used to translate power from the engine to wheels 116. In alternative embodiments a transmission may not be useful where a motor or engine is suitable for driving wheels 116 without the use of a transmission. A flange joint according to an exemplary embodiment allows a smaller flange joint to be used to deliver the same amount of torque as conventional flange joints, thereby saving costs in material and weight in the driveline.

Drive shaft 120, such as a prop shaft or a half shaft may be used as part of a driveline to drive wheels 116 with power from motor 112. Drive shaft 120 may be coupled to a flange joint 200 which may be part of a CV joint or other type of joint.

FIGS. 2a-e show perspective views of an exemplary flange joint 200. Flange joint 200 may include a first flange 210, a second flange 220, and fasteners 230 such as threaded bolts. Shear force members 240 such as pins may connect between first flange 210 and second flange 220. Shear force members 240 may be a hardened metal dowel or the like that is pressed into first flange 210. In other embodiments the shear force member 240 may be other structures such as other types of pins including a grooved pin, a roll pin, a spiral pin, a taper pin, and/or other types of pins. Shear force member 240 may also be a ball, such as a hardened steel ball that is held between first flange 210 and second flange 220 with fasteners 230 or the like. In the exemplary embodiment the shear force member 240 may prevent fasteners 230 from breaking and/or loosening due to the shear force between first flange 210 and second flange 220.

Figure 2A:
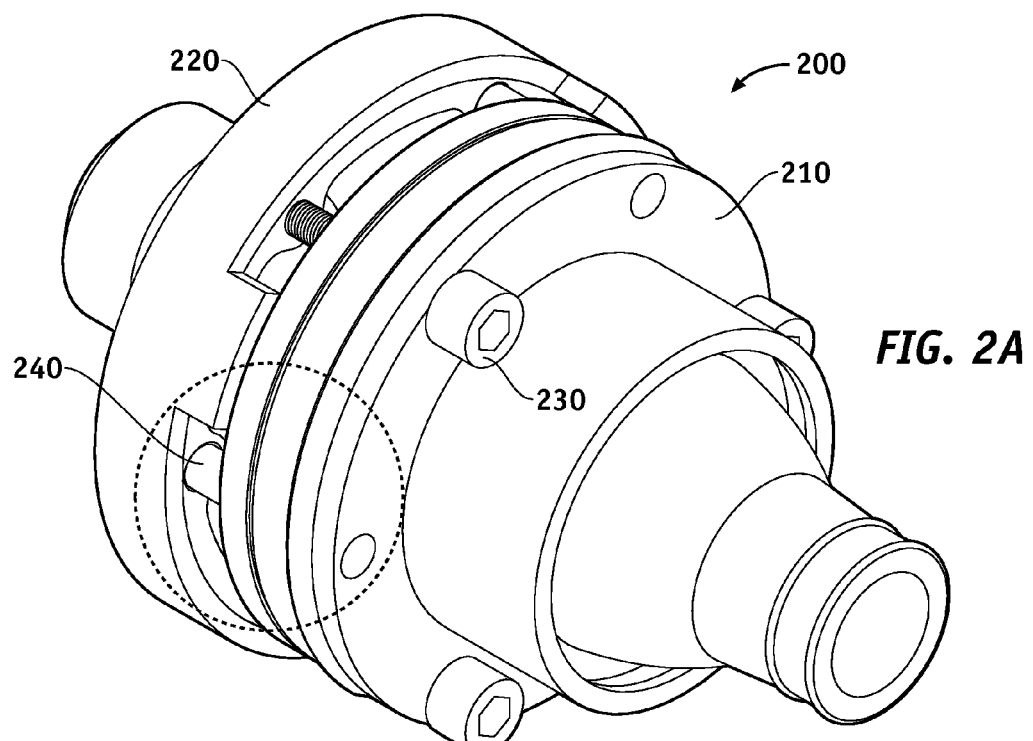
FIG. 2a is a perspective view of an exemplary flange joint.
Figure 2B:
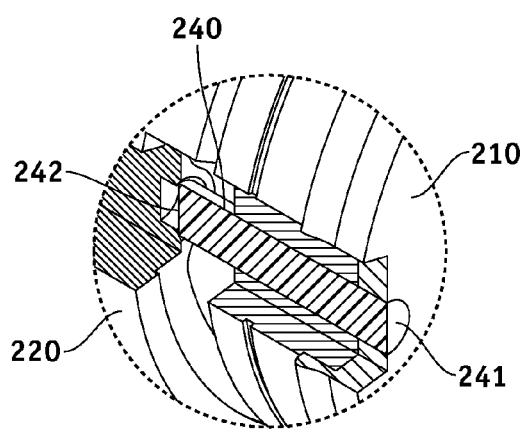
FIGS. 2b-2e are perspective views of shear force members and corresponding openings or recesses according to exemplary embodiments.
Figure 2C:
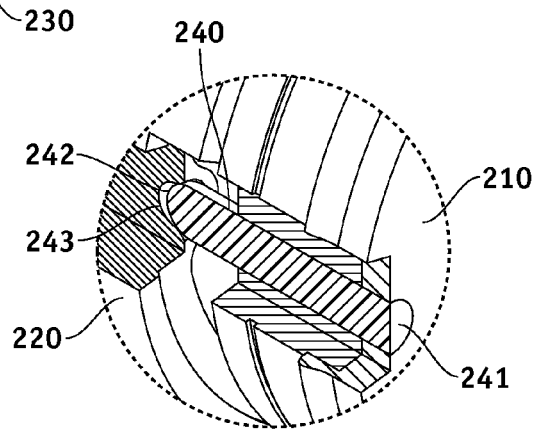
Figure 2D:
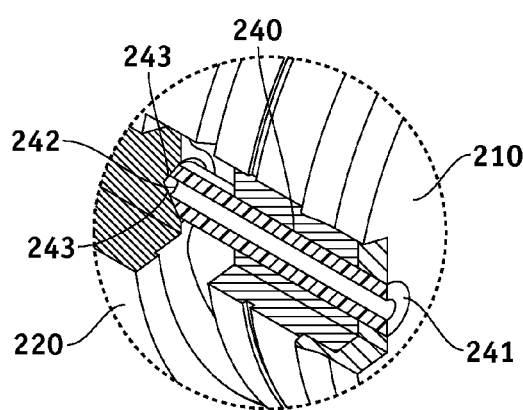

FIGS. 2a-2e show example embodiment of shear force member 240. In the exemplary embodiments of FIGS. 2a-2d shear force member 240 is a pin and has a first part 241 that is fit into first flange 210. Shear force member 240 in the exemplary embodiments also has a second part 242 that is configured to contact second flange 220 when first flange 210 and second flange 220 are assembled. In FIG. 2b, for example, second part 242 of shear force member 240 enters an opening or a recess in second flange so that when shear force is applied between first flange 210 and second flange 220 shear force member 240 can bear the shear force load. In another embodiment shown in FIG. 2c, shear force member 240 has a partial spherical shape as part of second part 242. The partial spherical shape provides second part 242 of shear force member 240 with an inclined surface that makes contact with a recess or opening in second flange 220. In the exemplary embodiment of FIG. 2c the opening in second flange 220 includes an inclined surface so that when torque is applied that is great enough to cause a displacement or slippage between first flange 210 and second flange 220, shear force member 240 may translate the shear force to a normal force that causes increased pressure along the longitudinal direction of fasteners 230. In the exemplary embodiment an increase in pressure along the longitudinal direction of fasteners 230 prevents further slippage, prevents loosening of fasteners, and improves efficiency of torque delivered through flange joint 200.

Other forms of shear force member 240 may be used in other embodiments as discussed above, such as a roll pin as shown in FIG. 2d. An angle for inclined plane 243 may be selected based on the strength of shear force member 240 so that when torque is applied that causes slippage or displacement between first flange 210 and second flange 220, shear force member will be displaced, even if only slightly rather than being deformed or broken. The inclined surface of recess or opening in second flange 220 may be formed at a similar angle as inclined surface 243 of shear force member 240. Fasteners 230 such as threaded fasteners, may have greater ability to withstand normal forces (such as forces parallel to the shaft of the threaded fastener) than shear forces (such as forces perpendicular to the shaft of the threaded fastener). In the exemplary embodiment, by transferring the shear force to a normal force, the strength of the joint may be increased because of the fasteners higher strength in withstanding normal forces.

Figure 2E:
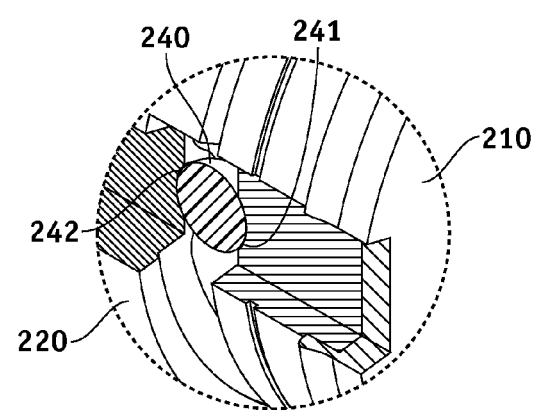

In an alternative embodiment, shear force member 240 may be a ball as shown in FIG. 2e. First flange 210 and second flange 220 may have openings or recesses that receive shear force member 240 so that rotational displacement between first flange 210 and second flange 220 will cause shear force member 240 to be displaced from the recess in the first flange and/or the recess in the second flange. With the shear force member displaced relative to one of the openings or recesses in the exemplary embodiment, first flange 210 and second flange 220 are forced apart in opposition to the force applied by fasteners 230, thereby retaining sufficient force on fasteners 230 to translate torque through flange joint 200. First part 241 of the shear force member 240 may be the top of the ball configured to be held in place in the recess or opening in the first flange 210 by the fasteners. Second part 242 of shear force member 240 may be the bottom of the ball, configured to be held in contact with the recess or opening in the second flange 220 by the fasteners. In the embodiment with a ball for the shear force member 240, an advantage in manufacturing may be realized as the recesses or openings may be formed with variations in the diameter of the recess or openings. Allowing variation in the diameter of the recess or opening the flange joint may allow a lower cost manufacturing process as well as other advantages.

Figure 3:
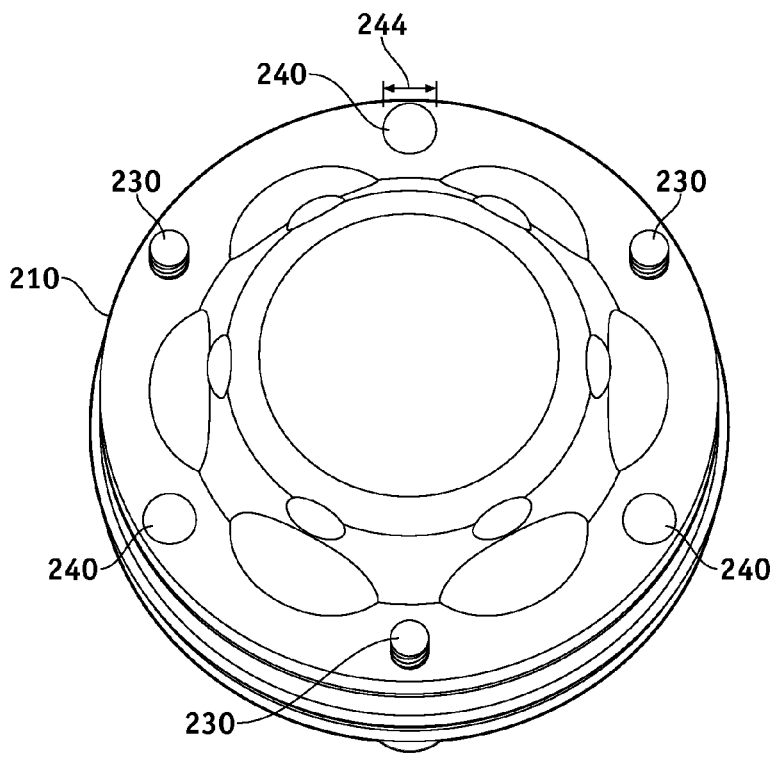
FIG. 3 is a bottom perspective view of a flange with fasteners and shear force members according to an exemplary embodiment.
Figure 4:
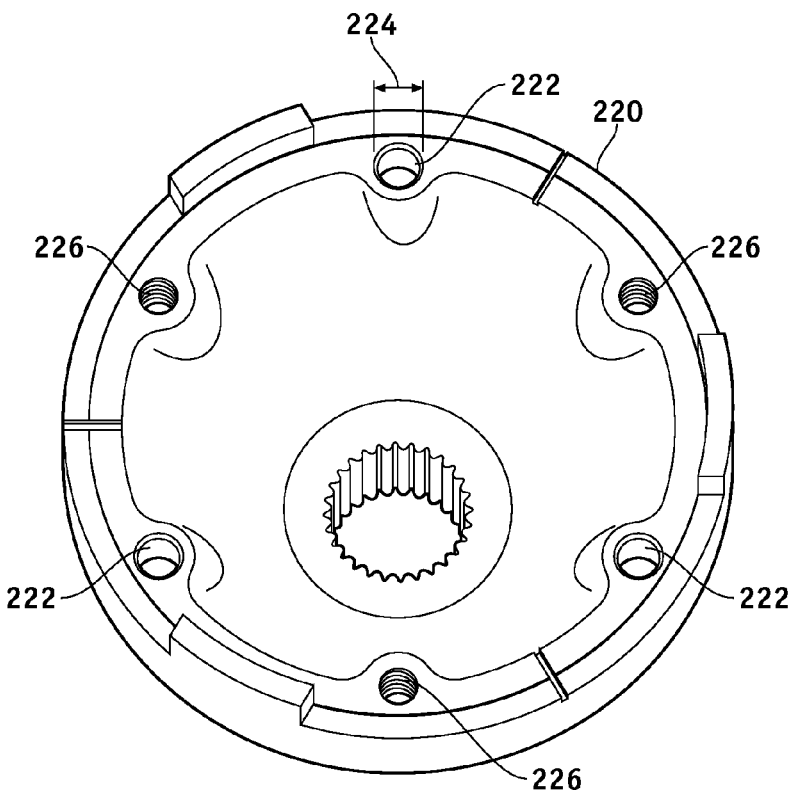
FIG. 4 is a bottom perspective view of a flange with openings for the shear force members and threaded openings for threaded fasteners according to an exemplary embodiment.

FIG. 3 shows a view of an exemplary first flange 210. In the exemplary embodiment shown in FIG. 3, three shear force members 240 are placed between three fasteners 230. The exemplary shear force members are dowel pins with rounded ends, and have an outer diameter 244. FIG. 4 shows a view of an exemplary second flange 220 configured to be coupled to first flange 210. Exemplary second flange 220 includes openings 222 for receiving a portion of shear force members 240. In the exemplary embodiment openings 222 have an outer diameter 224 that are the same size or smaller than outer diameter 244 of shear force member 240. Second flange 220 may also include threaded openings 226 to receive fasteners 230 that may be threaded fasteners. In the exemplary configuration shear force members 240 increase the tension on fasteners 230 under conditions when slippage would likely occur in conventional flange joints, thereby reducing slippage and failure of flange joint 200.

Figure 5:
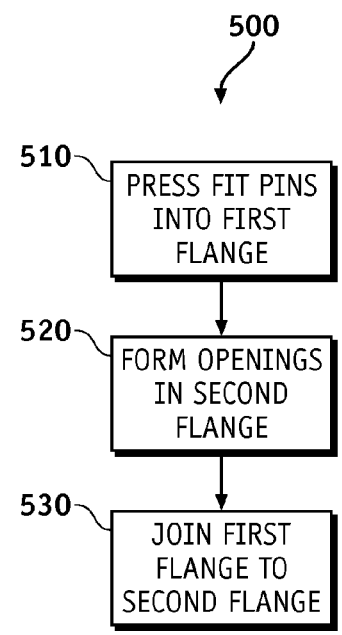
FIG. 5 is a flow chart of an exemplary method of assembling a flange joint.

A flange joint may be assembled in any manner. FIG. 5 shows a method 500 of assembling a flange joint. In a first step pins may be press fit into the first flange (step 510). As discussed above pins may be used, as well as other structures in other embodiments to bear shear force and/or translate shear force into a normal force relative to fasteners 230 that hold together flange joint 200 (FIGS. 2-4). In one embodiment the process of manufacturing a standard flange joint with six or eight fasteners may be modified by changing half of the openings for fasteners in the first flange with pins. In other embodiments more or fewer than half of the fasteners of a conventional flange joint may be replaced by pins or other structures. In an exemplary embodiment all of the pins in one flange are pressed into place at the same time to reduce labor costs. In other embodiments the pins are pressed into place in more than one step.

Another step in exemplary method 500 is to form openings in a second flange (step 520). In the exemplary embodiment the number of openings in the second flange corresponds to the number of pins in the first flange. The openings in the second flange may go all the way through the second flange, or may be a recess or indentation in the second flange. In exemplary method 500 the openings may be formed at positions that correspond to the position of pins in the first flange. In one embodiment of method 500, the openings are formed with an inclined surface relative to the pins. In an exemplary embodiment of method 500, the process of manufacturing a standard flange joint with six or eight threaded fastener openings may be modified by forming openings for the pins in the second flange in the place of half of the threaded fastener openings.

With the pins or other structures in the first flange and openings in the second flange for the pins or other structures, the first flange may be joined to the second flange using fasteners (step 530). In exemplary method 500, the pins may have a larger diameter than the openings for the pins in the second flange, so that pins can move from the center of the openings without permanent deformation. The flange joint may be used in vehicle applications as well as other applications such as machinery with drive shafts.

According to the various exemplary embodiments and method described above, a flange joint may be assembled in a relatively low cost manner that has the ability to deliver relatively high torque in a driveline. Further, a flange joint may be assembled that prevents loosening and/or breaking of fasteners in the flange joint. A flange joint may also be assembled that delivers adequate torque with fewer fasteners and/or with a smaller size flange joint.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A shaft flange joint comprising:
   a first flange with a first recess;
   a second flange configured to join with the first flange to thereby translate rotational motion between the first flange and the second flange, the second flange having a second recess corresponding in position to the first recess in the first flange;
   a shear force member having a first part configured to contact the first recess and a second part opposite the first part configured to contact the second recess, the second part having an inclined surface; and
   multiple fasteners connecting the first flange to the second flange such that the inclined surface of the shear force member is held in contact with the second recess.

2. The shaft flange joint of claim 1 wherein the shear force member is a pin with the first part mounted in the first recess.

3. The shaft flange joint of claim 1 wherein the shear force member is a dowel pin.

4. The shaft flange joint of claim 1 wherein the shear force member is a roll pin.

5. The shaft flange joint of claim 1 wherein the inclined surface is shaped as a portion of a sphere.

6. The shaft flange joint of claim 5 wherein the second recess has an inclined surface.

7. The shaft flange joint of claim 1 wherein the shaft flange joint is connected to one of a prop shaft or a half shaft.

8. The shaft flange joint of claim 1 further comprising:
   an additional recess in the first flange and an additional recess in the second flange; and
   an additional shear force member having an additional first part configured to contact the additional first recess and an additional second part opposite the additional first part configured to contact the additional second recess, the additional second part having an additional inclined surface;
   wherein the additional inclined surface of the additional shear force member is held in contact with the additional second recess by the multiple fasteners.

9. The shaft flange joint of claim 1, wherein the second part of the shear force member has an outer shear force member diameter, and the recess has an outer recess diameter that is smaller than the outer shear force member diameter.

10. The shaft flange joint of claim 1, wherein the shaft flange joint is connected to a drive shaft in a vehicle.

11. A vehicle comprising:
   a shaft configured to transfer rotational motion;
   a flange joint coupled to the shaft comprising:
   a first flange having a first opening;
   a second flange having a second opening aligned to the first opening;
   a shear force member coupled between the first opening and the second opening, wherein the second opening in the second flange is formed with a sloped portion; and
   a fastener securing the first flange to the second flange.

12. The vehicle according to claim 11 wherein the shear force member is configured to transfer a difference in relative rotational position between the first flange and the second flange to an increase in a normal force on the fastener.

13. The vehicle according to claim 11 wherein the shear force member has a sloped portion corresponding the sloped portion of the second opening.

14. The vehicle according to claim 11 wherein the shear force member has a first part fitted into the first opening in the first flange, and a second part shaped as a portion of a sphere.

15. The vehicle according to claim 11 wherein the shear force member is a pin fixed into the first opening and has an outer pin diameter, and the second opening is a recess and has an outer recess diameter that is smaller than the outer pin diameter.

16. The vehicle according to claim 11 wherein the shear force member is in the shape of a ball and partially enters the first opening in the first flange and partially enters the second opening in the second flange.

17. A method of assembling a flange joint configured to transmit torque, the flange joint comprising a first flange and a second flange, and two shear force members configured to transfer a difference in relative rotational position to increased normal force, the method comprising:
   forming two openings in the first flange;
   forming two openings in the second flange corresponding to the two openings in the first flange wherein a second opening in the second flange is formed with a sloped portion; and
   joining the first flange to the second flange using fasteners, with the shear force members contacting the openings in the first flange and the openings in the second flange, wherein the shear force members create a slip fit such that movement of the first flange relative to the second flange increases a normal force on the fasteners.

18. The method of claim 17 wherein the openings in the second flange are round, each opening having an opening outer diameter, and wherein the shear force members are round having a shear force member diameter, and wherein the shear force member diameter is larger than the opening outer diameter.

* * * * *